US009988024B2

(12) United States Patent
Schwartz et al.

(10) Patent No.: US 9,988,024 B2
(45) Date of Patent: Jun. 5, 2018

(54) RETARDER INTEGRATED BRAKING SYSTEM AND METHOD (71) Applicant: Caterpillar Inc., Peoria, IL (US)

(72) Inventors: Timothy Schwartz, Metamora, IL (US); Rodney Menold, Peoria, IL (US); Ian Macdonald, Hoffman Estates, IL (US); Joel Skalet, Chillicothe, IL (US)

(73) Assignee: Caterpillar Inc., Deerfield, IL (US)

( * ) Notice: Subject to any disclaimer, the term of this patent is extended or adjusted under 35 U.S.C. 154(b) by 165 days.

(21) Appl. No.: 14/836,173

(22) Filed: Aug. 26, 2015

(65) Prior Publication Data

US 2017/0057476 A1    Mar. 2, 2017

(51) Int. Cl.
| B60T 8/172 | (2006.01) |
| B60T 8/171 | (2006.01) |
| G07C 5/08 | (2006.01) |
| B60T 10/00 | (2006.01) |
| B60T 13/58 | (2006.01) |
| F16D 57/00 | (2006.01) |

(52) U.S. Cl.
CPC ............ *B60T 8/172* (2013.01); *B60T 8/171* (2013.01); *B60T 10/00* (2013.01); *B60T 13/588* (2013.01); *F16D 57/00* (2013.01); *G07C 5/0808* (2013.01); *G07C 5/0825* (2013.01); *G07C 5/0841* (2013.01); *B60T 2220/04* (2013.01)

(58) Field of Classification Search
CPC ......... B60T 8/171; B60T 8/172; B60T 10/00; B60T 13/588; B60T 2220/04; G07C 5/0841; G07C 5/0825; G07C 5/0808; F16D 57/00; F16D 2220/04
See application file for complete search history.

(56) References Cited

U.S. PATENT DOCUMENTS

| 5,105,923 A | 4/1992 | Iizuka | |
| 5,496,098 A | 3/1996 | Brearley | |
| 6,286,992 B1 * | 9/2001 | Kyrtsos | G01K 13/00 374/104 |
| 6,536,408 B1 * | 3/2003 | Warner | B60T 7/042 123/323 |

(Continued)

FOREIGN PATENT DOCUMENTS

| EP | 1291219 | 3/2003 |
| EP | 2450245 | 9/2013 |

Primary Examiner — Jerrah Edwards
Assistant Examiner — Donald J Wallace
(74) Attorney, Agent, or Firm — Baker Hostetler; James S. Bennin (57) ABSTRACT A machine includes: an axle having wheels mounted to it; a brake system configured to provide service braking to the wheels; a brake pedal operatively connected to the brake system to provide a braking power to the wheels in proportion to the position of the brake pedal; a pedal sensor operatively connected to the brake pedal to sense the position of the brake pedal; a retarder system configured to selectively slow the wheels down; a speed sensor operatively connected to the machine to detect a speed associated with the machine; a controller operatively connected to the speed sensor, brake pedal position sensor, and retarder system wherein the controller is configured to operate the retarder system based on signals received from the speed sensor and brake pedal position sensor. A method for providing an indication to an operator may also be included.

18 Claims, 10 Drawing Sheets (56) References Cited

U.S. PATENT DOCUMENTS

| | | |
|---|---|---|
| 6,986,554 B2 | 1/2006 | Versteyhe et al. |
| 7,120,531 B1 | 10/2006 | Persson et al. |
| 7,134,985 B2 | 11/2006 | Watanabe et al. |
| 7,410,023 B2 | 8/2008 | Crombez |
| 7,672,771 B2 | 3/2010 | Nakanishi et al. |
| 8,214,113 B2 | 7/2012 | O'Neil et al. |
| 8,491,064 B2 | 7/2013 | Petersson |
| 8,708,072 B2 | 4/2014 | Montocchio et al. |
| 8,717,158 B2 | 5/2014 | Roach |
| 8,768,587 B2 | 7/2014 | Wulf et al. |
| 8,910,758 B2 | 12/2014 | Jensen et al. |
| 8,950,378 B2 | 2/2015 | Holt et al. |
| 2001/0016795 A1 | 8/2001 | Bellinger |
| 2004/0036592 A1* | 2/2004 | Vertenten ............ B60T 17/221 340/453 |
| 2005/0096183 A1* | 5/2005 | Watanabe ............ B60K 31/04 477/182 |
| 2009/0111655 A1* | 4/2009 | Hatanaka ............ B60T 17/02 477/218 |
| 2011/0015038 A1* | 1/2011 | Lovell ................ B60T 10/00 477/186 |
| 2013/0298867 A1* | 11/2013 | Holt ................... F02D 13/04 123/321 |
| 2014/0034010 A1* | 2/2014 | Serrano .............. F02D 17/02 123/324 |
| 2015/0224981 A1* | 8/2015 | Fujishiro ............ B60K 6/46 701/22 |

* cited by examiner

| loops | time (sec) | % ret power adder |
|---|---|---|
| 0 | 0 | |
| 1000 | 10 | 0 |
| 1100 | 11 | 5 |
| 1200 | 12 | 10 |
| 1300 | 13 | 15 |
| 1400 | 14 | 20 |
| 1500 | 15 | 25 |
| 1600 | 16 | 30 |
| 1700 | 17 | 35 |
| 1800 | 18 | 40 |
| 1900 | 19 | 45 |
| 2000 | 20 | 50 |

RETARDER INTEGRATED BRAKING SYSTEM AND METHOD

TECHNICAL FIELD

The present disclosure relates generally to a control system for an on and off road machine. More particularly, the present disclosure relates to a system that integrates control of the retarder system during service brake application.

BACKGROUND

Large machines may require a lot of braking power in order to slow down and stop, or to maintain ground speed with descending grades. As such, many large machines are equipped with at least two types of braking systems. In some instances, both a typical friction brake system is used as well as a retarder system. Typical retarder systems (sometimes referred to as engine brakes) may use the engine to slow down the machine. Retarder systems may work very well in slowing a machine down. However, some retarder system's effectiveness decreases as the machine speed becomes low. Therefore, it is difficult for some retarder systems to bring a machine to a complete stop. This is where the friction brake system is useful, in that it can stop a machine. However, one problem with friction brake systems is they can overheat and ware with overuse. Even machines with wet brake systems, where the rotor and the stator associated with the brake system may be immersed in oil, may have the friction brake systems and the associated oil overheat if the friction brake systems are overused.

U.S. Pat. No. 8,491,064 describes a method for braking a machine. According to this patent, the machine includes a circuit adapted for transmitting a brake signal from an operator control braking element to brake devices arranged at a plurality of the machine's ground engaging elements via a brake fluid. The method includes detecting a fluid pressure in the circuit, using the detected fluid pressure level as an input for determining a brake power for at least one auxiliary brake in the machine and controlling the auxiliary brake responsively.

However, for various reasons it may be desirable to operate an auxiliary braking systems such as a retarder system using different inputs other than fluid pressure.

Accordingly, it is desirable to provide a method and apparatus that can detect an operator's call for braking power and operate appropriate braking systems in order to slow the machine in accordance with the operator's call for braking power.

SUMMARY

The present disclosure describes a machine that includes: an axle having wheels mounted to it; a brake system configured to provide service braking to the wheels; a brake pedal operatively connected to the brake system to provide a braking power to the wheels in proportion to the position of the brake pedal; a pedal sensor operatively connected to the brake pedal to sense the position of the brake pedal; a retarder system configured to selectively slow the wheels down; a speed sensor operatively connected to the machine to detect a speed associated with the machine; a controller operatively connected to the speed sensor, brake pedal position sensor, and retarder system wherein the controller is configured to operate the retarder system based on signals received from the speed sensor and brake pedal position sensor.

The present disclosure also describes a method for controlling a retarder system comprising the steps of: calculating an operator requested amount of brake power (RBP) based, at least in part, by a sensed pedal position of a service brake pedal; calculating a reference retarding power (RRP) based, at least in part, by a speed associated with the drivetrain; calculating a retarding power (PR) by multiplying the operator requested brake power (RBP) by a first percentage; calculating a percent retarding power (% RP) by dividing the retarding power (RP) by the reference retarding power (RRP); engaging a retarder when the percent retarding power (% RP) is greater than a second percentage in a range of approximately 7%-13% of the reference retarding power for greater than a given amount of time.

The present disclosure also describes, a method for providing an indication to an operator including: calculating an operator requested amount of brake power (RBP) based, at least in part, by a sensed pedal position of a service brake pedal; measuring how long the requested brake power (RBP) is requested; calculate a predicted axle oil temperature (POT) based, at least in part, on the operator requested amount of brake power (RBP) and a threshold amount of time the operator requested brake power (RBP) is assumed to be requested; compare the predicted axle oil temperature (POT) to a threshold temperature; and displaying an indication to the operator if the predicted axle oil temperature (POT) is above the threshold temperature.

DETAILED DESCRIPTION

An embodiment in accordance with the present disclosure provides a system and method for providing retarder integrated braking for a machine. Many large machines include two types of braking systems. For example, a typical friction brake system (also referred to as a service brake system) and a retarder system (also referred to as an engine brake). Retarder systems are often independently operated from the service friction brake system. The retarder systems may operate in a high, medium, low, and off mode. Other systems may use high, low, and off retarder settings and still others may simply use on and off modes. Some embodiments in accordance with the present disclosure allow both the retarder system and the friction brake system to be operated in an integrated manner so that simply applying a brake pedal may activate both the service brake and the retarder system. In some embodiments, the retarder system may also be independently or semi-independently operated. In some embodiments a controller receives various inputs from sensors or other input devices and operates both the service brake and the retarder system based on these inputs. The braking control system will now be described with reference to the drawing figures, in which like reference numerals refer to like parts throughout.

Figure 1:
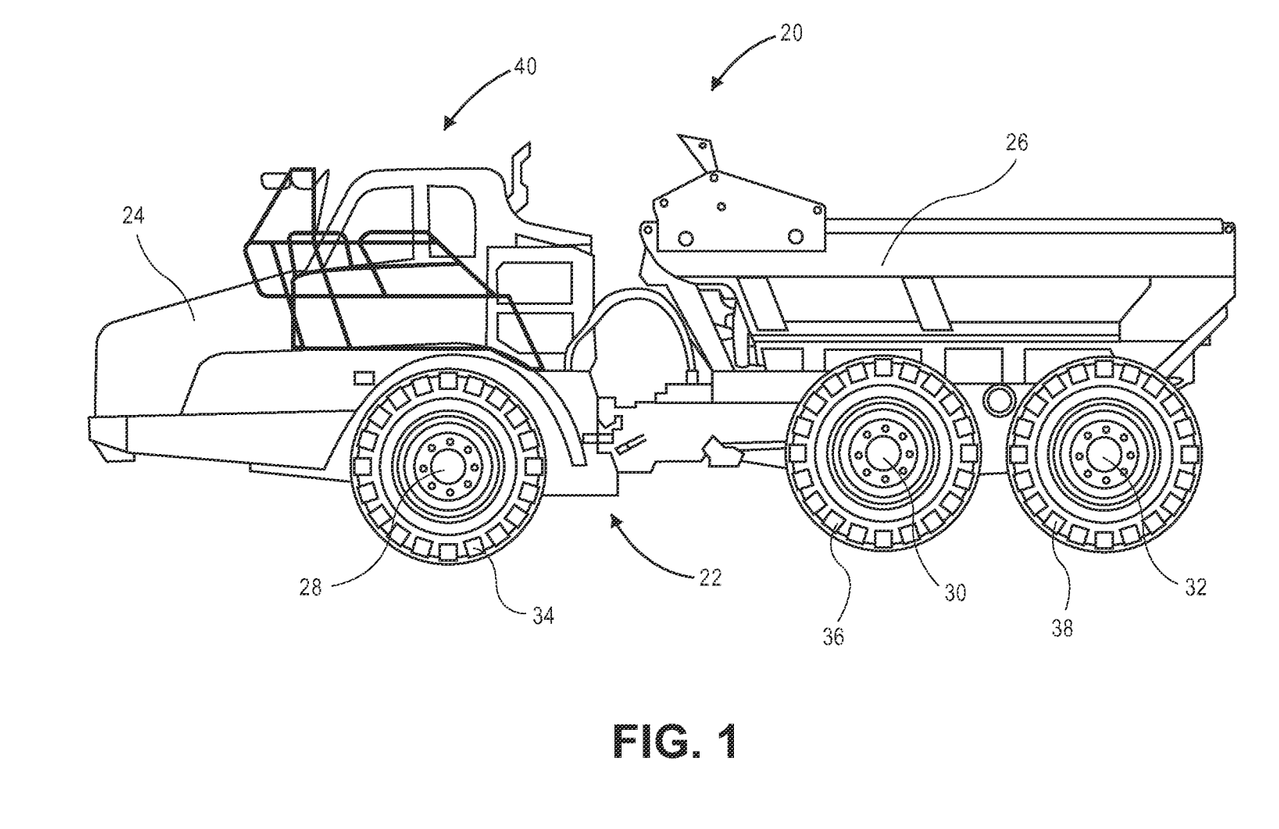
FIG. 1 is a side view of a machine equipped with a retarder integrated braking system and method.

An embodiment of the present inventive apparatus is illustrated in FIG. 1. FIG. 1 illustrates an example machine 20 that may incorporate an integrated brake and retarder system 21 (see FIG. 2) in accordance with the present disclosure. The machine 20 illustrated in FIG. 1 comprises an articulated truck. The articulated truck includes a joint 22 that separates a front end 24 from a rear end 26. As shown, the front axle 28 is part of the front end 24 and is forward of the joint 22. The center axle 30 and the rear axle 32 are both part of the rear end 26 and are located behind the joint 22. The front wheels 34 are mounted to the front axle 28 and the middle wheels 36 are mounted to the center axle 30 and the rear wheels 38 are mounted to the rear axle 32. The cab 40 houses an operator and various controls. The cab 40 is part of the front end 24 of the truck. The joint 22 pivots and allows the machine 20 to turn sharply.

The machine 20 is capable of operating both on and off road. While the articulated truck is illustrated as an example machine 20 used in accordance of the present disclosure, other machines 20 having different configurations may also use the integrated brake and retarder system 21 described herein. The articulated truck is meant as an example of the machine 20 and is not limiting as to what type of machine may be equipped with an integrated brake and retarder system 21.

Figure 2:
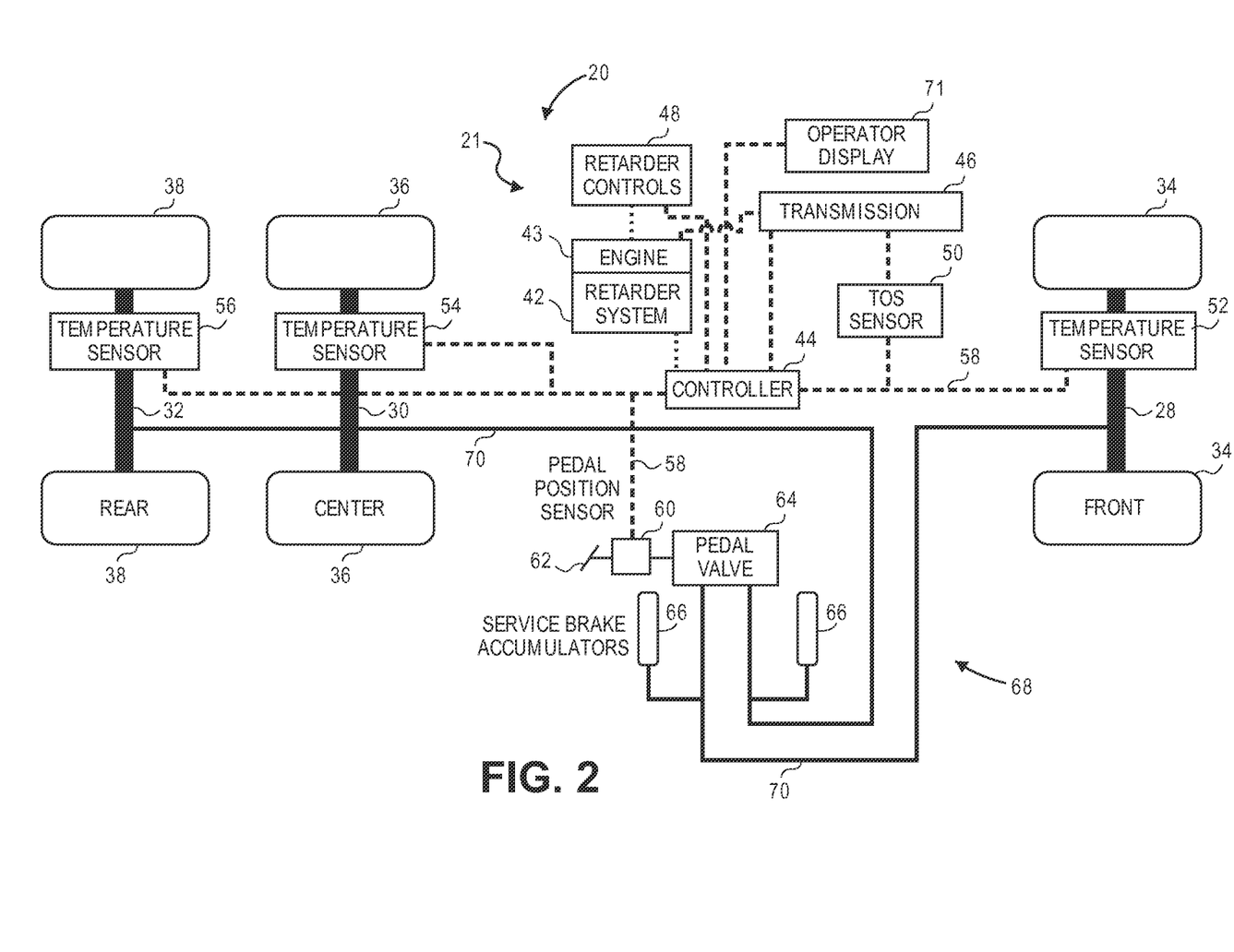
FIG. 2 is a schematic diagram of a machine equipped with a retarder integrated braking system and method.

FIG. 2 is a schematic diagram of the machine 20. The machine 20 is equipped with the integrated brake and retarder system 21. The machine 20 includes a retarder system 42 which is operatively connected to a controller 44. The retarder system 42 may be integrated with the engine 43 as shown, or in other embodiments integrated with the transmission 46, or alternatively, a torque converter. The retarder system 42 may also be operatively connected to other components. The transmission 46 is operatively connected to both the retarder system 42 and the controller 44. Retarder controls 48 which may be located in the cab 40 (the cab 40 is best shown in FIG. 1) are also operatively connected to the retarder system 42 and may also be operatively connected to the controller 44. The transmission 46 is also operatively connected to a transmission operating speed (TOS) sensor 50.

The front axle 28 is equipped with a front axle oil temperature sensor 52, which senses the temperature of the oil located in the front axle 28 and communicates the sensed temperature to the controller 44. Likewise, the center axle 30 is equipped with a middle axle oil temperature sensor 54 and the rear axle 32 is equipped with a rear axle oil temperature sensor 56. Both sensors 54 and 56 are operatively connected to the controller 44. Controller connectors 58 provide connections between the controller 44 and various components operatively connected to the controller 44. In some embodiments, the connectors 58 may be actual wired connections. In other embodiments, the connections may be wireless. In still other embodiments, a combination of wired and wireless connections may be used. The front, middle and rear wheels 34, 36, and 38 are located on their respective axles 28, 30 and 32.

A brake pedal position sensor 60 is disposed near the service brake pedal 62. The brake pedal position sensor 60 is operatively connected to the controller 44 and configured to measure the position of the service brake pedal 62. When an operator presses the service brake pedal 62, the pedal valve 64 will open causing fluid from the service brake accumulators 66 to flow to the brakes associated with each wheel 34, 36, and 38. As the service brake pedal 62 moves, its position will be sensed by the brake pedal position sensor 60 which will send a signal indicative of the position of the service brake pedal 62 to the controller 44. An operator display 71 may be operatively connected to the controller 44 and will be discussed in more detail later below.

Figure 3:
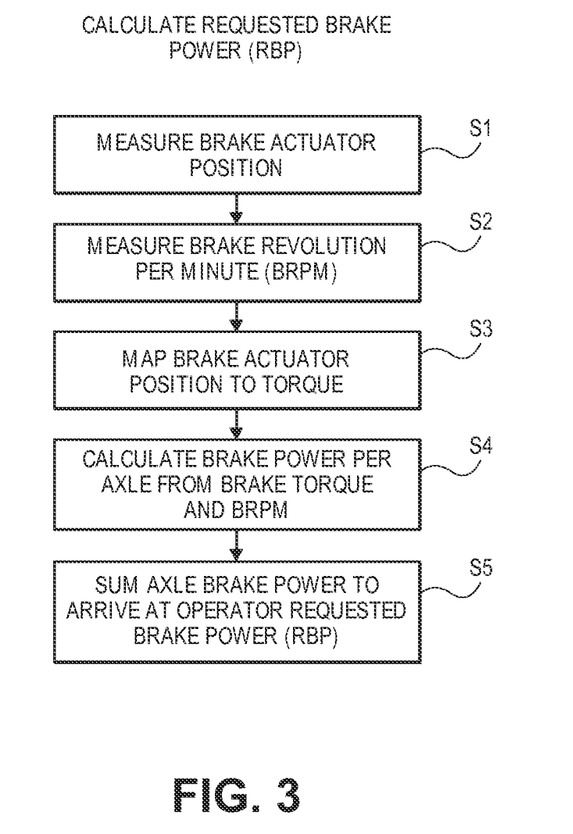
FIG. 3 is a flowchart illustrating steps accomplished in order to calculate requested brake power.
Figure 4:
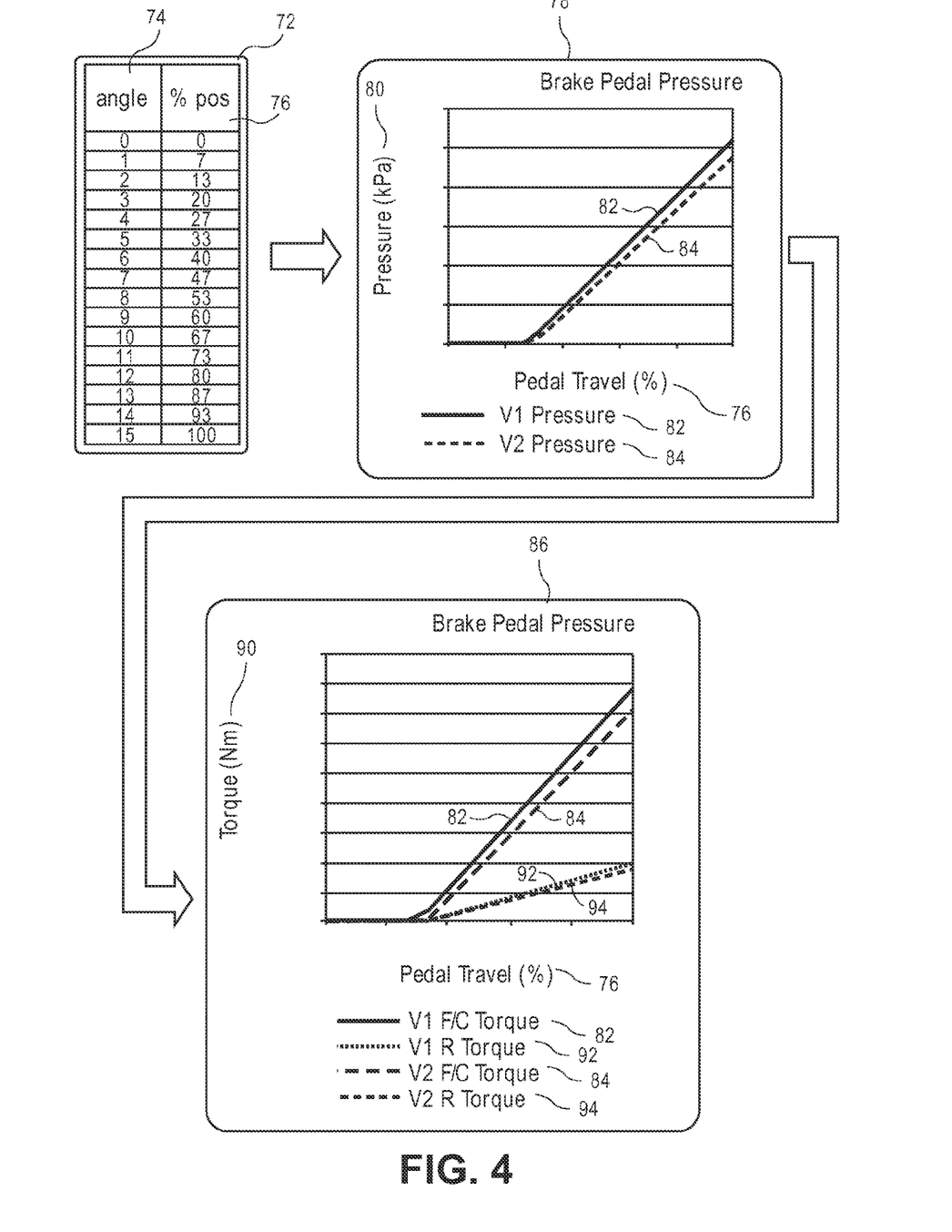
FIG. 4 illustrates a series of charts and data used to calculate requested brake power.

FIG. 3 is a flowchart illustrating a method for calculating the requested brake power (RBP). An operator requests an amount of brake power by pressing the brake pedal 62 (shown in FIG. 2). In block S1, a position of the brake actuator or brake pedal 62 is measured. The brake pedal position sensor 60 is used to measure the physical position of the brake pedal 62. In some embodiments, the angle 74 of the pedal 62 as shown in FIG. 4 is converted into a pedal position 76, as shown in the table 72 of FIG. 4. The table 72 of FIG. 4 is an example table and is not limiting in any way. In the example table, the actuator or brake pedal 62 (shown in FIG. 2) is able to pivot to an angle 74 between 0 and 15°. An angle 74 of zero is considered the zero percent position and the maximum angle 74 of 15 is considered the hundred percent position. Thus various angles 74 can be converted to a percentage 76 as shown.

Block S2 is to measure the brake revolution per minute (BRPM) at the wheel 34, 36, 38. This can be measured as how many revolutions per minute the wheels 34, 36, and 38 or axles 28, 30 or 36 turn. This can be measured by a sensor operatively connected to the controller 44 or may be calculated by data received from the TOS sensor 50 which measures the drive train speed.

Block S3 maps a brake actuator position (or pedal 62 shown in FIG. 2) with a pressure. In some embodiments, the Torque in (Nm) is calculated from applied pressure per brake as shown in the chart 78 in FIG. 4. The values associated with the front and center axles 28 and 30 as shown in FIG. 2 are converted from pressure to torque by (1.559103×Papp-269.4586) and the rear axle 32 may be converted by (0.389776×Papp-66.35882). Where Papp is the pressure 80 per brake. The rear axle 32 may have a different calculation in that its friction brakes may be of a different size than the friction brakes on the front and center axles 28 and 30. This results in curves 82 and 84 in chart 78 of FIG. 4 which show a relationship between pressure 80 and percent of pedal position 76 for two different example machines 20 (V1 and V2). These brake pedal pressure to brake pedal torque calculations may be done in software or hardware of the controller 44.

Block S4 shows calculating an operator requested braking power per axle and then the axles are summoned to arrive at the total requested braking power (RBP) at S5. The chart 78 is an intermediate result. The data it represents may be used to calculate brake power 90. As shown in chart 72 of FIG. 4, percent pedal position 76 is shown relative to brake power 90. For various curves 82, 84, 92, 94. The various curves 82, 84, 92, and 94, of graph 86 in FIG. 4 represent the front, center 28, 30, and rear 32 axles for two different trucks. In some embodiments, the operator braking power per axle may be calculated as follows. The brake torque is multiplied by the brake RPM which is then divided by unit conversions ($2 \times 2\pi/(60 \times 1000)$) to put the result in Newton meters (Nm).

The brake RPM may be calculated from ground speed through the final drive. The ground speed may be a calculated number which is arrived at by the TOS sensor 50 (shown in FIG. 2) sensing the shaft speed of the transmission. In other embodiments, the ground speed or speed associated with the machine 20 may be detected with any suitable sensor operatively connected to the controller 44, for example, but not limited to, a speedometer, a wheel sensor or any other suitable speed detecting sensor or system. This detected speed can be used to calculate ground speed of the machine 20 (see FIGS. 1 and 2).

In some embodiments, if the brake pedal position percentage 76 is unable to be determined, the controller 44 will revert to a default position where it puts the retarder system 42 in a "high" position in order to relieve the service brake system 68 and provide a maximum amount of retarder braking.

Figure 5:
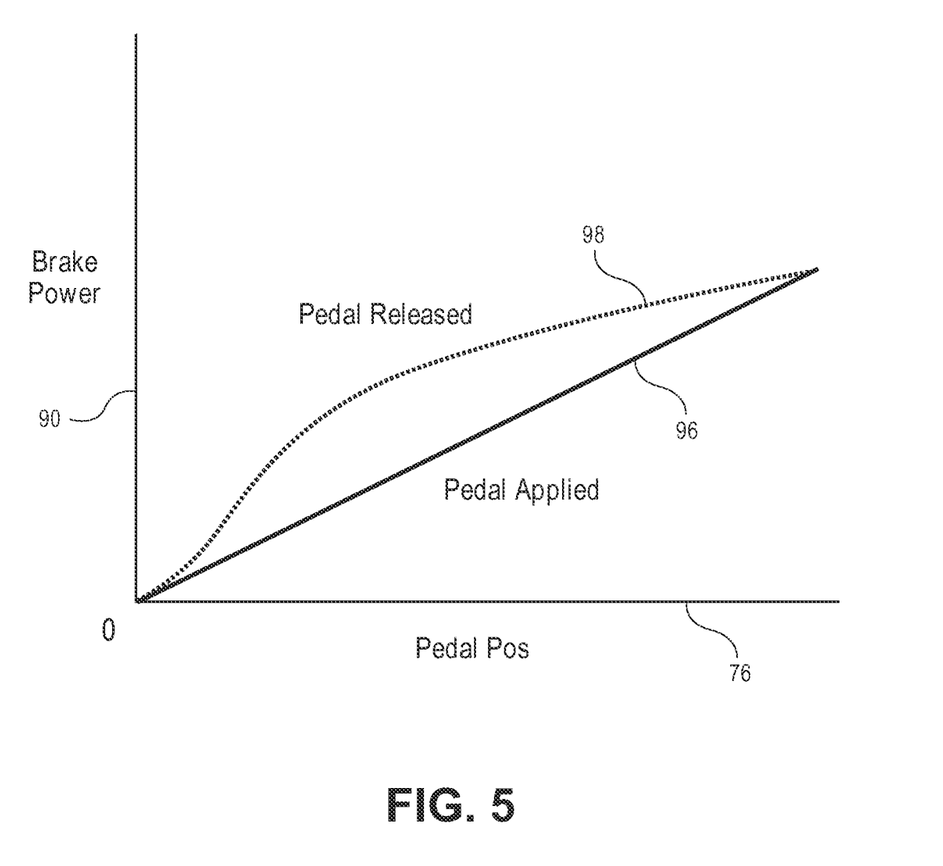
FIG. 5 is a graph illustrating a relationship between pedal position and requested brake power when the brake pedal is applied and when the brake pedal is released.

In some embodiments, rate limits may be applied to a change of brake pedal position percentage 76 when the brake pedal 62 is released. Rate limits are not applied to pressing the pedal 62, only releasing. The plot in FIG. 5 illustrates the amount pedal position percentage 76 with respect to brake power (in torque) 90. The line showing the pedal applied 96 is not the same as the line 98 of brake power with respect to the pedal position percentage 76 when the pedal 62 is released 98. As can be seen in FIG. 5, more brake power 90 is applied with respect to pedal position percentage 76 when the pedal 62 is released 98 than when the pedal is applied 96. By using rate limits on releasing the pedal 62 the retarder system 42 will be engaged longer as the brake pedal 62 is released. This feature allows for the retarder system 42 to more slowly release when the brake pedal 62 is released.

Figure 6:
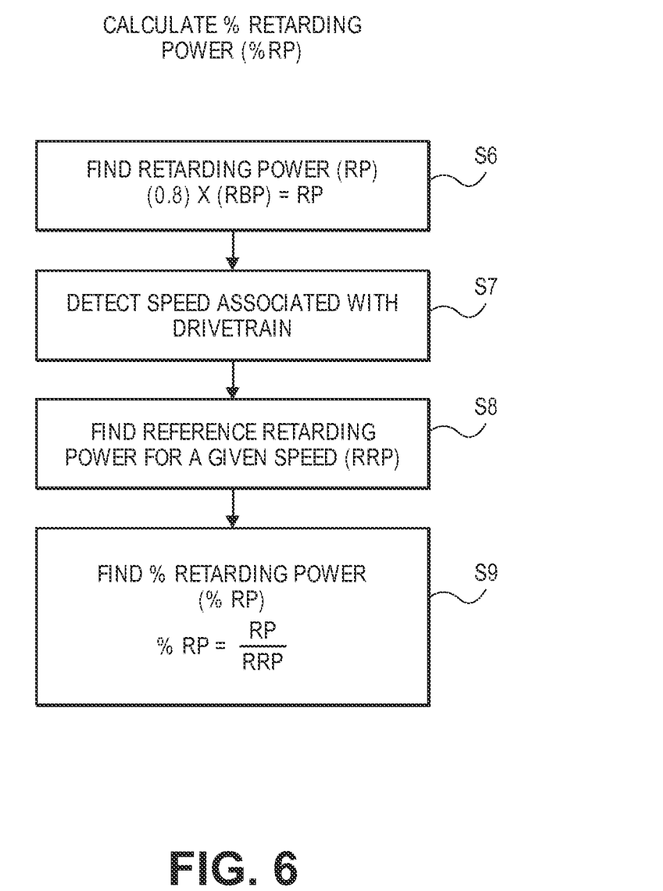
FIG. 6 is a flowchart illustrating steps accomplished in calculating percent retarding power.

FIG. 6 is a flowchart illustrating a method for calculating the percentage retarding power (% RP). Block S6 includes finding the retarding power (RP). In some embodiments the retarding power (RP) is the requested brake power (RBP) times a percentage. In some embodiments the percentage is approximately 80%. Thus the retarding power (RP)=(0.8)×(RBP).

In order to calculate the percent retarding power (% RP) a speed associated with the drivetrain is measured in block S7. This speed may be detected by the transmission operating speed sensor 50 as shown in FIG. 2. In block S8, the reference retarding power (RRP) is found. The reference retarding power (RRP) is the amount of stopping power the retarder system 42 can provide for a given machine speed. As discussed above, the machine speed may be calculated from the speed associated with the transmission 46 or, in other words, the speed sensed by the transmission operating speed sensor 50. The reference retarding power (RRP) is a known amount (it may be a nominal amount) of retarding power the retarder system 42 can provide for a given machine and speed. Because the reference retarding power (RRP) is a known amount for given retarder system 42 for a given machine 20 at a given speed, block S8 may involve the controller 44 looking up the reference retarding power for a detected speed of the machine 20 in a lookup table or similar database. In some embodiments, the reference retarding power (RRP) for various speeds may be saved in a lookup table or database associated with the controller 44.

At block S9, the controller 44 will find the percent retarding power (% RP) by dividing the retarding power (RP) by the reference retarding power (RRP). In other words, (% RP)=(RP/RRP). Ranges for the (RP) may include between approximately 7-13% to activate the retarder.

Figure 7:
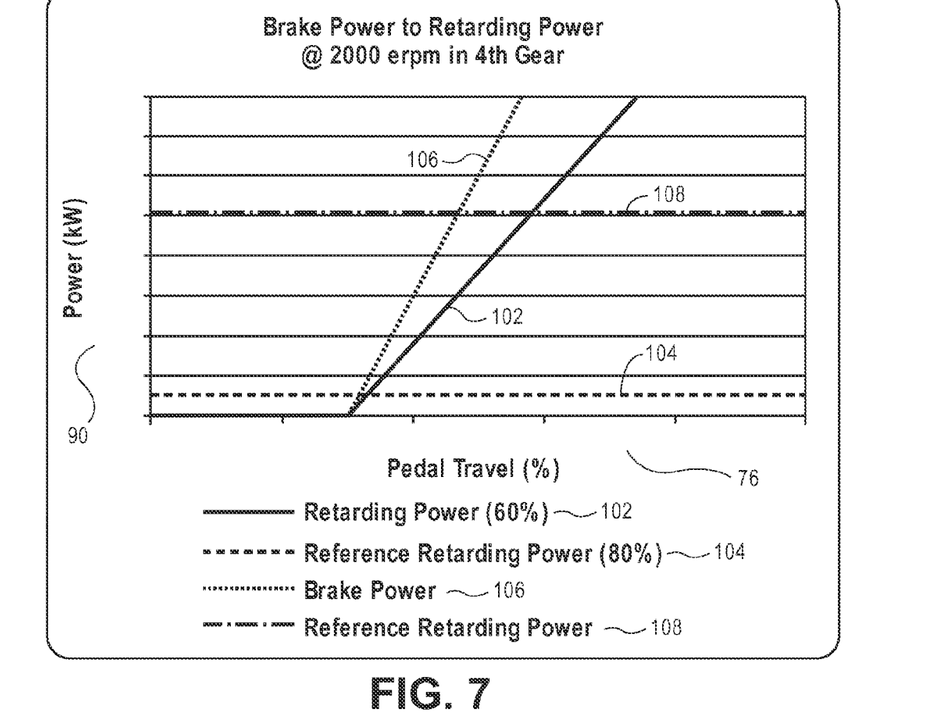
FIG. 7 is a graph illustrating a relationship between percentage of pedal travel and brake power.

FIG. 7 is an example graph 100 showing an example relationship between a retarding power (RP) 102, reference retarding power (RRP) 104, brake power (BP) and reference retarding power (RRP) 108 for a brake power 90 and percent pedal position 76.

In some embodiments, the amount of the retarder braking is increased the longer an operator continues to actuate the service brake pedal 62. The intention is to reduce the stress on the service brake system 68 and perform braking with the retarder system 42 instead. In such instances, the longer the brake pedal 62 is placed in a certain position, the percentage of retarder power (% RP) will be increased. As a result, additional retarding will occur even when the brake pedal 62 remains in the same position.

Figure 8:
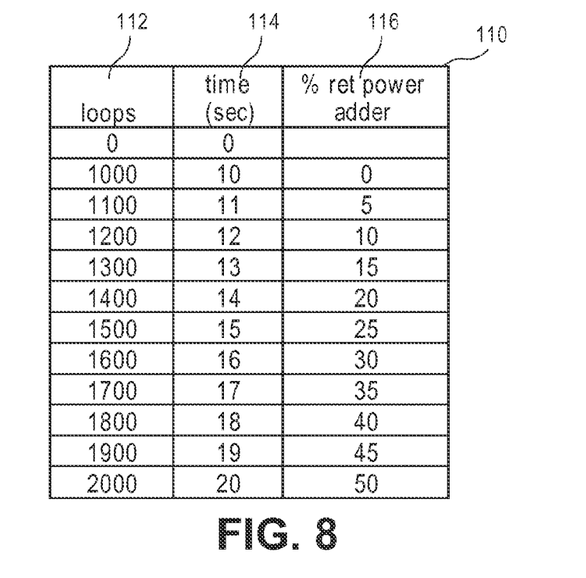
FIG. 8 is a table illustrating how much percentage retarding power is added with respect to an amount of time brake power is requested.

In accordance with the present disclosure, FIG. 8 illustrates a table 110 showing how much additional percentage retarder power (% RP) is added with respect to time 114. The loops column 112 may illustrate an internal timer clock by using loops used in accordance with some controllers 44. The values illustrated in table 110 are meant to be examples only. One of ordinary skill the art after reviewing this disclosure, will understand how much additional percentage of retarding power (% RP) 116 to add per how much time the pedal 62 is in a braking position to achieve a desired result.

In some embodiments, the percent retarder adder 116 feature described above and illustrated in FIG. 8 will be activated when the percent retarding power (% RP) is greater than a certain threshold of reference retarding power (RRP) for a set amount of time. In some embodiments, the percentage is approximately 10% of the reference retarding power (RRP) and the set amount of time is approximately 10 seconds. Other examples may be approximately between 7 and 13 seconds and may include intervening endpoints. Other embodiments may use different percentages and different time periods in accordance with the present disclosure.

In some embodiments, if a certain period of time (for example but not limited to approximately 10 seconds) have passed without the percent retarding power (% RP) falling below a given threshold (for example, but not limited to, approximately 10% or ranges such as approximately 7-13% or other percentages) the feature of increasing the percent power adder as set forth in FIG. 8 may be engaged.

In some embodiments, when the percent retarding power (% RP) falls below a certain threshold (for example but not limited to approximately 10% or ranges such as approximately 7-13% or other percentages), the controller 44 may set the retarder system 42 to a low level or even hold requests for use of retarder of the retarder system 42. In some embodiments, a request for power such as activating the throttle will disengage the retarder system 42 and cause the percent power adder feature and its associated thresholds to reset.

In some embodiments, if the integrated brake and retarder system 21 is already reducing amount of retarder being used for other reasons, the percent retarder power adder feature may be disabled. This is to reduce the likelihood of the retarder system 42 being engaged due to low ground speed on level ground or excessive deceleration. In some embodiments, the retarder system 42 will be disabled if the machine 20 is going less than a minimum threshold speed. In some embodiments the minimum threshold speed may be 2 km/h, other minimum thresholds may be between 1 and 3 km/hr. Other minimum threshold speeds may be selected by one of ordinary skill the art in accordance with this disclosure after reviewing this disclosure based on individual system and/or machine requirements.

Figure 9:
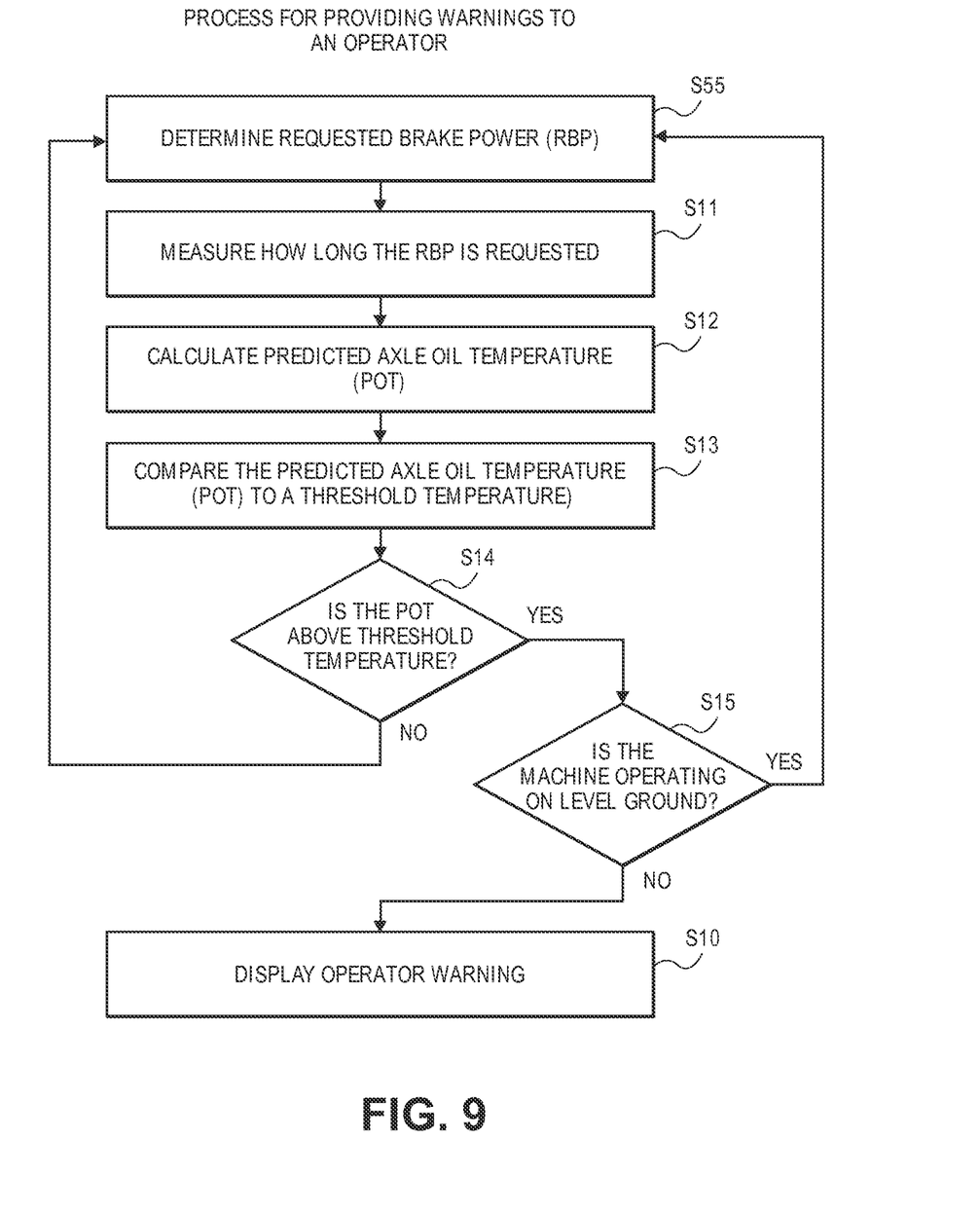
FIG. 9 is a flowchart illustrating a process for providing indications of the service brake overheating to an operator.

In some embodiments, an aspect of the machine 20 (FIG. 1) is that it may provide an indication to an operator located in the cab 40 (FIG. 1) that the service brake system 68 (FIG. 2) is being abused when the retarder system 42 is already being used at a maximum level. In such instances, an indication may be given. FIG. 9 illustrates a flowchart and process for providing indications to an operator. In block S5 the requested brake power (RBP) may be determined. Determining the requested brake power is the subject of FIG. 3 and is discussed in detail above. The next block, at block S11 is to measure how long the requested brake power (RBP) is requested. This block involves a timer which may be embedded in the controller 44 (see FIG. 2) which measures how long the requested brake power (RBP) is requested.

Figure 10:
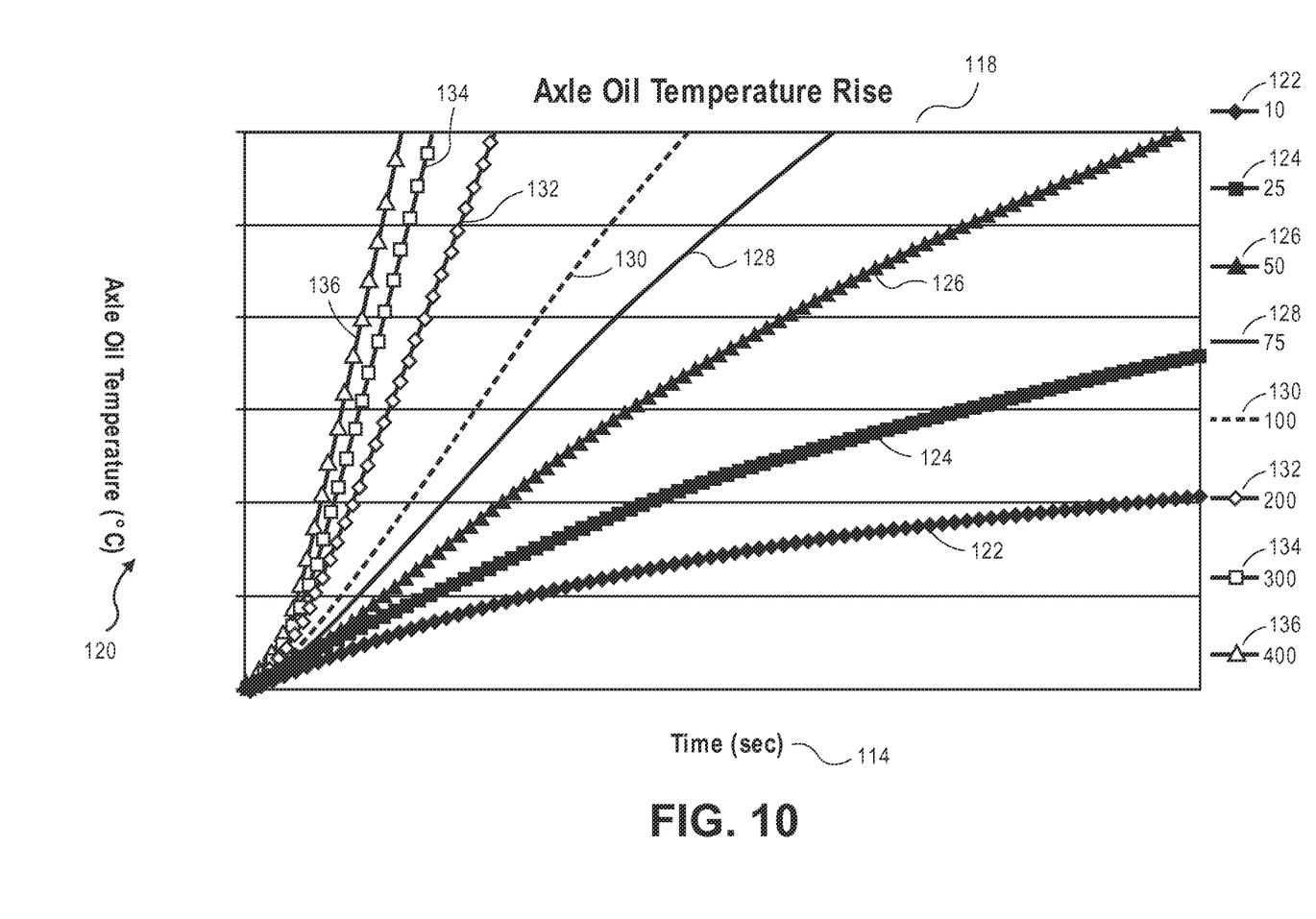
FIG. 10 is a graph illustrating a predicted axle oil temperature with respect to time for various requested brake powers.
Figure 11:
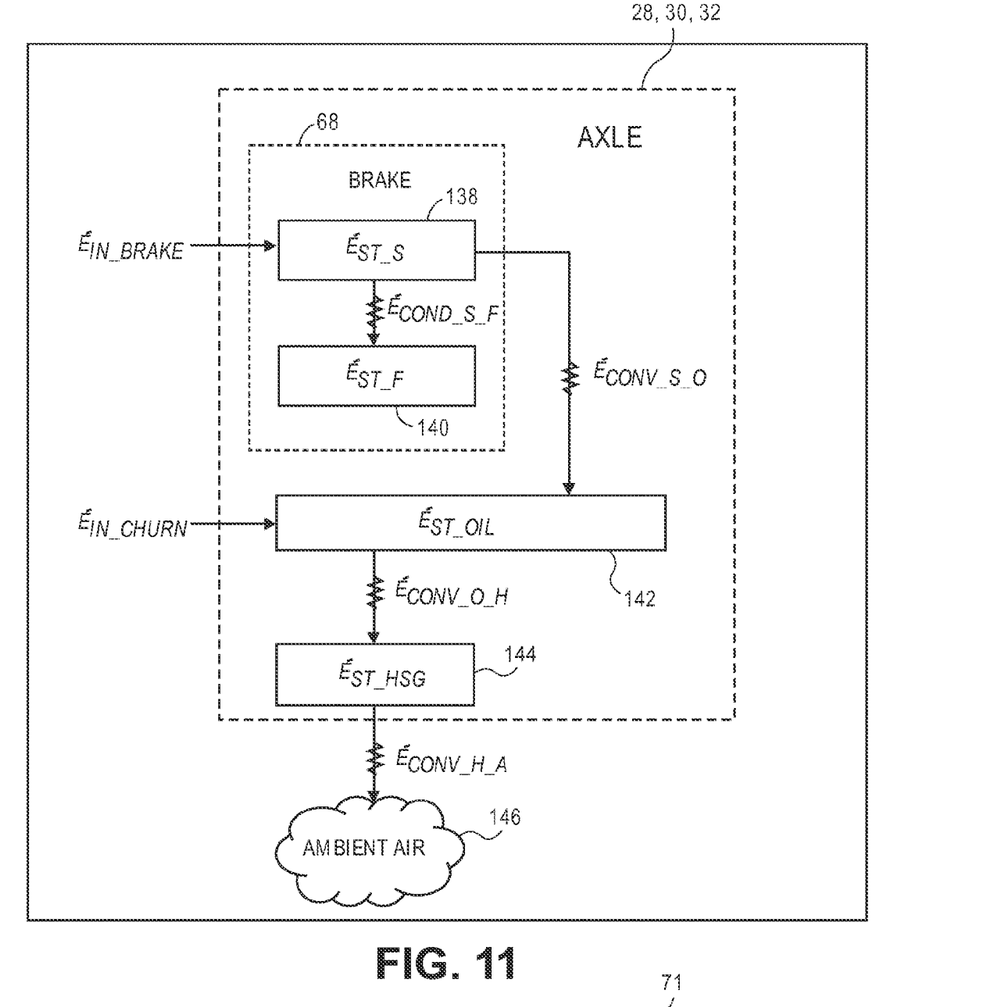
FIG. 11 is a schematic diagram showing heat entering the axle and leaving the axle to ambient air.

Block S12 in the process for providing indications to an operator is to calculate a predicted axle oil temperature (POT). FIGS. 10 and 11 illustrate how the POT is determined. The service brake power is mapped to an axle oil temperature rise rate. The rise rate is assumed to be the maximum rise of a curve within a temperature range of 80° C. and 110° C. FIG. 10 illustrates the curves lines 122, 124, 126, 128, 130, 132, 134, 136 for various service brake power inputs 136. For example, line 122 illustrates a 10 kW service brake power input. Line 124 illustrates 25 kW service brake power input. Line 126 illustrates a 50 kW service brake power input, line 128 illustrates a 75 kW service brake power input line, 130 illustrates a 100 kW power input, line 132 illustrates a 200 kW service brake power input. Line 134 illustrates a 300 kW service brake power input and line 136 illustrates a 400 kW service brake power input. These lines 122 through 136 illustrate the axle oil temperature 120 (in degrees C.) over time 114 (in seconds). The values shown on FIG. 10 are illustrated for known systems using known axle oil. One of ordinary skill in the art would understand that different curves or lines would be used for different systems using different axle oils. The values illustrated as lines shown in FIG. 10 may be programmed into the controller 44 (FIG. 2), or stored in a lookup table or other similar database.

In some instances (such as parameters not illustrated in FIG. 10) a dynamic temperature may be determined based on temperature rise rate and change in time. In some instances the change in time (delta time) may be a constant, such as, for example but not limited to, approximately 15 seconds. The temperature limit is a value used by the system to predict how long it will take it to achieve the temperature limit under the current friction brake requests. If the integrated brake and retarder system 21 determines that the axle oil temperature is quickly approaching or will approach or exceed the temperature limit, the integrated brake and retarder system 21 will provide an indication to the operator that the service brake system 68 is being abused. This indication is used to encourage the operator to reduce the speed of the machine 20 by reducing the gear of the machine 20 (when the operator indication feature is being used, the retarder system 42 is already operating at full capacity) to reduce the demands on the service brake system 68. In an example embodiment, the temperature limit used is 100° C. In other embodiments other temperature limits may be used.

The dynamic threshold (DT) is calculated by the temperature limit (in this case 100° C.) minus the rise rate (in ° C./seconds) multiplied by the change in time. Expressed another way, DT=100° C.−rise rate*delta T. In some embodiments, the delta T may be a constant, such as but not limited to, approximately 15 seconds. Other time periods may also be used. The integrated brake and retarder system 21 will predict what the axle oil 145 temperature will be at the current braking setting in the next delta T (15 seconds).

FIG. 11 is an example illustrating how the axle oil temperature may be modeled and using heat transfer analysis techniques, may be determined. Heat is input into the axle 28, 30, 32 from the service brake system 68 (Ein_brake) and heat of churning (Ein_churn) the oil within the axle 28, 30, 32 as the axle 28, 30, 32 rotates with movement of the machine 20. As the service brake system 68 engages the brake stator 138 contacts the rotor 140 contact between the stator 138 and rotor 140 causes heat Econd_S_F to build with existing heat Est_S and Est_F in the stator 138 and the rotor 140. Heat Ecov_S_O is generated by friction between the stater 138 and the rotor 140 and is transferred primarily by convection to the oil 142. The heat Est oil in the oil 142 is transferred primarily by convection Econv_O_H to the axle housing 144. The heat Est_HSG in the housing 144 is transmitted primarily by convection Econv_H_A to the ambient air 146.

Returning now to FIG. 9 at block S13 the integrated brake and retarder system 21 compares the predicted axle oil temperature (POT) to see if the predicted oil temperature (POT) at delta T will exceed a threshold temperature. At block S14 the integrated brake and retarder system 21 determines if the (POT) is above the threshold temperature. If the (POT) is above the threshold temperature and it is determined as shown in block S15 that the machine 20 is not operated on level ground, then the integrated brake and retarder system 21 will display an operator indication. If the machine 20 is operating on level ground, then the integrated brake and retarder system 21 will return back to block S55 and not display the operator indication as shown in block S10.

Figure 12:
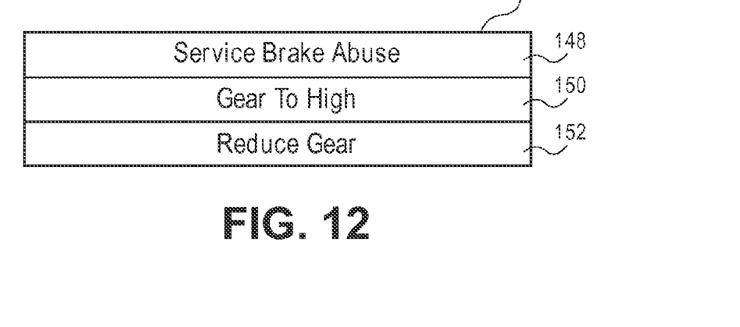
FIG. 12 illustrates an example indicator.

FIG. 12 illustrates an example operator display 71 that may be illuminated or displayed when the service brake system 68 (See FIG. 2) is being abused. As previously mentioned, this display 71 would only be illuminated when the retarder system 42 (see FIG. 2) is already being engaged at a maximum level. As such, if it is determined that the service brake system 68 is being operated to exceed a desired operating capability, or in other words, to cause the axle oil temperature to exceed a minimum threshold, the operator display 71 may illuminate to indicate service brake abuse 148 and then illuminate an indication that the gear that the machine 20 is in too high a gear 150. A second indicator 152 will illuminate to instruct the operator to reduce the gear. By reducing the gear, the combination of a high amount of retarder, the reduced gear, and the use of service brake should slow the machine 20 down without causing the axle oil temperature to rise above a threshold temperature.

Although an example of the machine 20 and integrated brake and retarder system 21 are shown and described using example temperatures, times and other example values, it will be appreciated that other values can be used and adapted for specific implementations.

INDUSTRIAL APPLICABILITY

Various embodiments in accordance with the present disclosure allow an integrated brake and retarder system 21 to directly detect an operator's call for braking power by measuring the position of the brake actuator (e.g. the brake pedal 62). The integrated brake and retarder system 21 may then, based on other characteristics of the machine 20 such as speed and current settings, can operate a retarder system 42 and service braking system 68 together in a manner to provide a machine 20 with appropriate braking characteristics as well as avoiding overuse and potential overheating (which may result in undue and/or premature wear) of the service brake system 68. Furthermore, some embodiments may provide an alarm if the service brake system 68 is being abused and provide alternative instructions for slowing down the machine 20 when the retarder system 42 is already fully engaged.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

We claim:

1. A machine comprising:
    an axle having wheels;
    a brake system configured to provide service braking to the wheels;
    a brake pedal operatively connected to the brake system to provide a braking power to the wheels in proportion to a position of the brake pedal;
    a pedal sensor operatively connected to the brake pedal to sense the position of the brake pedal;
    a retarder system configured to selectively slow the wheels down;
    a speed sensor operatively connected to the machine to detect a speed associated with the machine; and
    a controller operatively connected to the speed sensor, brake pedal position sensor, and the retarder system,
        wherein the controller is configured to operate the retarder system based on signals received from the speed sensor and brake pedal position sensor, and
        wherein, when controlling the retarder system, the controller is configured to:
            calculate a reference retarding power based on a speed associated with the machine,
            calculate a percent retarding power based on the reference retarding power and a requested amount of brake power associated with the position of the brake pedal, and
            engage the retarder system when the percent retarding power is greater than a particular percentage of the reference retarding power for a period of time that is greater than a threshold amount of time, the retarder system being engaged after an amount of the braking power has been applied to the wheels for a particular period of time.

2. The machine of claim 1, further comprising a transmission operatively connected to the wheels to provide rotational power to the wheels.

3. The machine of claim 2, wherein the speed sensor is operatively connected to the transmission and configured to detect a speed associated with the transmission and transfer a signal associated with the detected speed to the controller.

4. The machine of claim 3, wherein the controller is configured to determine a machine speed based on the detected speed from the transmission.

5. The machine of claim 1, further comprising a temperature sensor configured to sense a temperature of a fluid located within the axle and transmit a signal associated with the sensed temperature to the controller.

6. The machine of claim 5, wherein the controller is configured to predict a temperature associated with the axle fluid based on signals received from the brake pedal position sensor, the speed sensor, and the temperature sensor.

7. The machine of claim 6, wherein the controller determines an amount of time an actuator has been in a position as reported by the pedal position sensor when predicting the temperature associated with the axle fluid.

8. The machine of claim 1, wherein the controller is configured to delay changing a control signal sent to the retarder system when the sensed brake pedal position changes.

9. The machine of claim 1, further comprising an operator indicator operatively connected to the controller and configured to provide an indication signal to the operator informing the operator that at least one of:
    the service brake system is being abused, or
    a gear, the machine is operating in, needs to be reduced.

10. A method for controlling a retarder system, the method comprising:
    calculating a requested amount of brake power, requested by an operator, based on a sensed pedal position of a service brake pedal;
    applying a portion of the requested amount of brake power for a first period of time;
    calculating a reference retarding power based on a speed associated with the drivetrain;
    calculating a retarding power by multiplying the requested amount of brake power by a percentage;
    calculating a percent retarding power by dividing the retarding power by the reference retarding power; and
    engaging a retarder, after applying the portion of the requested amount of brake power for the first period of time, when the percent retarding power is greater than a particular percentage of the reference retarding power for a second period of time that is greater than a threshold amount of time.

11. The method of claim 10, further comprising disabling the retarder even when the percent retarding power decreases below the particular of the reference retarding power.

12. The method of claim 10, wherein the threshold amount of time is approximately 0.5 seconds.

13. The method of claim 10, wherein the percentage is approximately 80%.

14. The method of claim 10, wherein the particular percentage is approximately 10%.

15. The method of claim 10, further comprising disengaging the retarder when:
    the throttle is engaged, or
    a speed associated with the machine falls below a threshold speed.

16. The method of claim 10, wherein the speed associated with the drivetrain is the speed of rotation of a shaft coming out of a transmission.

17. The method of claim 10, further comprising reducing the retarder at a slower rate than the brake pedal is released.

18. The method of claim 10, further comprising increasing an amount of the retarder if the percent retarding power does not fall below the particular percentage after the second amount of time.

* * * * *